(12) United States Patent
Matsuda (10) Patent No.: US 11,313,462 B2
(45) Date of Patent: Apr. 26, 2022

(54) UTILITY VEHICLE

(71) Applicant: KAWASAKI JUKOGYO KABUSHIKI KAISHA, Kobe (JP)

(72) Inventor: Yoshimoto Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/118,183

(22) Filed: Dec. 10, 2020

(65) Prior Publication Data

US 2021/0088135 A1  Mar. 25, 2021

Related U.S. Application Data

(62) Division of application No. 16/008,459, filed on Jun. 14, 2018, now Pat. No. 10,900,563.

(51) Int. Cl.

| F16H 61/662 | (2006.01) |
| F16H 57/04 | (2010.01) |
| B60K 17/08 | (2006.01) |
| B60W 10/107 | (2012.01) |
| B60K 17/35 | (2006.01) |

(52) U.S. Cl.
CPC ... F16H 61/66236 (2013.01); F16H 57/0489 (2013.01); B60K 17/08 (2013.01); B60K 17/351 (2013.01); B60W 10/107 (2013.01); B60Y 2200/124 (2013.01); B60Y 2200/20 (2013.01); B60Y 2400/72 (2013.01)

(58) Field of Classification Search
CPC ... F16H 61/66236; B60K 17/08; B60W 10/04
See application file for complete search history.

(56) References Cited

U.S. PATENT DOCUMENTS

| 4,674,359 | A | 6/1987 | Hattori |
| 5,819,897 | A | 10/1998 | Murata |
| 8,613,336 | B2 | 12/2013 | Deckard et al. |
| 10,465,777 | B2 | 11/2019 | Chida et al. |
| 2009/0062069 | A1* | 3/2009 | Nedachi ................ F16H 61/16 477/97 |
| 2009/0124455 | A1 | 5/2009 | Brandsma et al. |
| 2011/0053720 | A1 | 3/2011 | Kang et al. |
| 2015/0081181 | A1* | 3/2015 | Takahashi ........... F16H 61/6624 701/51 |

(Continued)

FOREIGN PATENT DOCUMENTS

JP  2007100745 A  *  4/2007

*Primary Examiner* — Stacey A Fluhart
(74) *Attorney, Agent, or Firm* — Alleman Hall Creasman & Tuttle LLP (57) ABSTRACT

A utility vehicle comprises a traveling driving power source which generates rotational driving power for driving a drive wheel; a continuously variable transmission including an input shaft to which the rotational driving power transmitted from the traveling driving power source is input, an output shaft which outputs the rotational driving power toward the drive wheel, a drive pulley provided at the input shaft, a driven pulley provided at the output shaft, and a belt wrapped around the drive pulley and the driven pulley; a clutch which is disposed in a driving power transmission path at a location that is between the belt and the drive wheel and is capable of disconnecting the driving power transmission path; and a clutch actuator which operates the clutch.

20 Claims, 5 Drawing Sheets

(56) References Cited

U.S. PATENT DOCUMENTS

| | | | |
|---|---|---|---|
| 2015/0239476 A1 | 8/2015 | Inoue et al. | |
| 2016/0368474 A1* | 12/2016 | Komuro | B60K 6/387 |
| 2017/0314676 A1* | 11/2017 | Huang | F16H 55/56 |
| 2018/0111604 A1 | 4/2018 | Inoue | |
| 2018/0128367 A1* | 5/2018 | Kishi | F16H 61/0276 |
| 2020/0141488 A1* | 5/2020 | Oota | F16H 59/44 |
| 2021/0231211 A1* | 7/2021 | Itoo | F16H 61/66236 |

* cited by examiner

UTILITY VEHICLE

CROSS REFERENCE TO RELATED APPLICATIONS

The present application is a divisional of U.S. patent application Ser. No. 16/008,459, filed Jun. 14, 2018, and entitled UTILITY VEHICLE, the entire disclosure of which is hereby incorporated herein by reference for all purposes.

BACKGROUND OF THE INVENTION

Field of the Invention

The present invention relates to a utility vehicle including a belt-type continuously variable transmission (CVT).

Description of Related Art

U.S. Pat. No. 8,613,336 discloses a utility which is able to travel on an uneven road (travels off-road). The utility vehicle includes an engine which generates rotational driving power for allowing the vehicle to travel, and a continuously variable transmission (CVT) which changes the rotational driving power generated in the engine.

The CVT includes a belt used to transmit driving power. In a case where a drive wheel grips a ground surface after a quick wheel spin, or a case where the vehicle jumps and then the drive wheel grips the ground surface, an excessive load is applied from the ground surface to the drive wheel and then transmitted to the belt of the CVT. If an excessive load is frequently applied to the belt, the life of the belt is reduced, and the belt is required to be changed frequently.

SUMMARY OF THE INVENTION

The present invention addresses the above-described conditions, and an object of the present invention is to provide a utility vehicle which is capable of protecting a belt of a CVT from an excessive load.

According to an aspect of the present invention, a utility vehicle comprises a traveling driving power source which generates rotational driving power for driving a drive wheel; a continuously variable transmission including an input shaft to which the rotational driving power transmitted from the traveling driving power source is input, an output shaft which outputs the rotational driving power toward the drive wheel, a drive pulley provided at the input shaft, a driven pulley provided at the output shaft, and a belt wrapped around the drive pulley and the driven pulley; a clutch which is disposed in a driving power transmission path at a location that is between the belt and the drive wheel and is capable of disconnecting the driving power transmission path; and a clutch actuator which operates the clutch.

In accordance with this configuration, the clutch which can be operated by the clutch actuator is disposed in the driving power transmission path at a location that is between the belt of the CVT and the drive wheel. Therefore, in a case where an excessive load will be (is likely to be) transmitted from the drive wheel to the belt of the CVT, the clutch is disengaged, and thus the belt of the CVT can be protected from an excessive load.

According to another aspect of the present invention, a utility vehicle comprises a traveling driving power source which generates rotational driving power for driving a drive wheel; a continuously variable transmission including an input shaft to which the rotational driving power transmitted from the traveling driving power source is input, an output shaft which outputs the rotational driving power toward the drive wheel, a drive pulley provided at the input shaft, a driven pulley provided at the output shaft, and a belt wrapped around the drive pulley and the driven pulley; an excessive load detector which detects that an excessive load will be applied to the drive wheel; and a belt protection controller which suppresses a force transmitted to the belt, in a case where the excessive load detector detects that the excessive load will be applied to the drive wheel.

In accordance with this configuration, in a case where an excessive load will be (is likely to be) transmitted from the drive wheel to the belt of the CVT, the force transmitted to the belt is suppressed (reduced). Therefore, the belt of the CVT can be protected from an excessive load.

According to a further aspect of the present invention, there is provided a controller of a vehicle including: a traveling driving power source which generates rotational driving power for driving a drive wheel; and a continuously variable transmission including an input shaft to which the rotational driving power transmitted from the traveling driving power source is input, an output shaft which outputs the rotational driving power toward the drive wheel, a drive pulley provided at the input shaft, a driven pulley provided at the output shaft, and a belt wrapped around the drive pulley and the driven pulley, wherein the controller disengages a clutch disposed in a driving power transmission path at a location that is between the belt and the drive wheel, or suppresses the rotational driving power of the traveling driving power source, to suppress a force transmitted to the belt, in a case where it is detected that an excessive load will be applied to the drive wheel.

The above and further objects, features and advantages of the present invention will more fully be apparent from the following detailed description of a preferred embodiment with reference to the accompanying drawings.

DETAILED DESCRIPTION OF THE PREFERRED EMBODIMENTS

Hereinafter, the embodiments of the present invention will be described with reference to the drawings. The stated directions are from the perspective of a driver riding in a utility vehicle.

Embodiment 1

Figure 1:
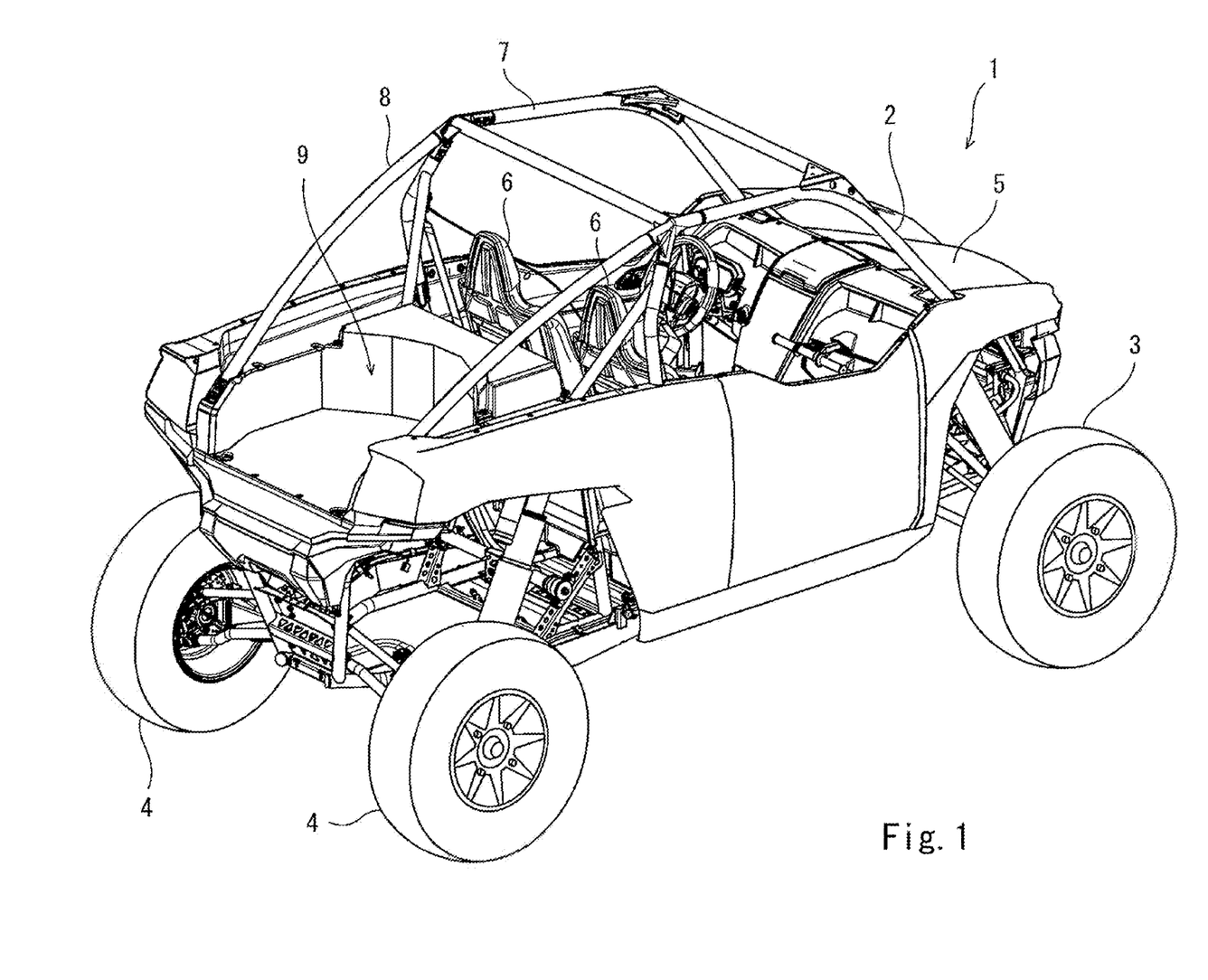
FIG. 1 is a perspective view of a utility vehicle according to Embodiment 1.

FIG. 1 is a perspective view of a utility vehicle 1 according to Embodiment 1. As shown in FIG. 1, the utility vehicle 1 includes a pair of right and left front wheels 3 supported by the front portion of a vehicle body frame 2, and a pair of right and left rear wheels 4 supported by the rear portion of the vehicle body frame 2. A space formed between the right and left front wheels 3 is covered from above by a resin-made hood 5. A pair of riding seats 6 (driver seat and passenger seat) are disposed behind the hood 5. The riding seats 6 are arranged side by side in a region that is in in the vicinity of a center of the vehicle body frame 2 in a forward and rearward direction.

The vehicle body frame 2 includes a cabin frame member 7, a pair of right and left rear gusset frame members 8, and the like. The vehicle body frame 2 is a pipe frame including a plurality of pipe members connected to each other. The cabin frame member 7 is disposed to surround a riding space in which the riding seats 6 are placed. The riding space surrounded by the cabin frame member 7 is exposed. The rear gusset frame members 8 couple the upper portions of the cabin frame member 7 to the rear portions of rear frame members (not shown), respectively. Behind the riding seats 6, a cargo carrier 9 defining a recessed loading space is provided.

Below the cargo carrier 9, an engine EG and a continuously variable transmission (CVT) which will be described later are disposed (see FIG. 2). The engine EG generates rotational driving power for driving drive wheels. In a case where the utility vehicle 1 is a two-wheel-drive vehicle, the front wheels 3 or the rear wheels 4 are the drive wheels. In a case where the utility vehicle 1 is a four-wheel-drive vehicle, the front wheels 3 and the rear wheels 4 are the drive wheels.

Figure 2:
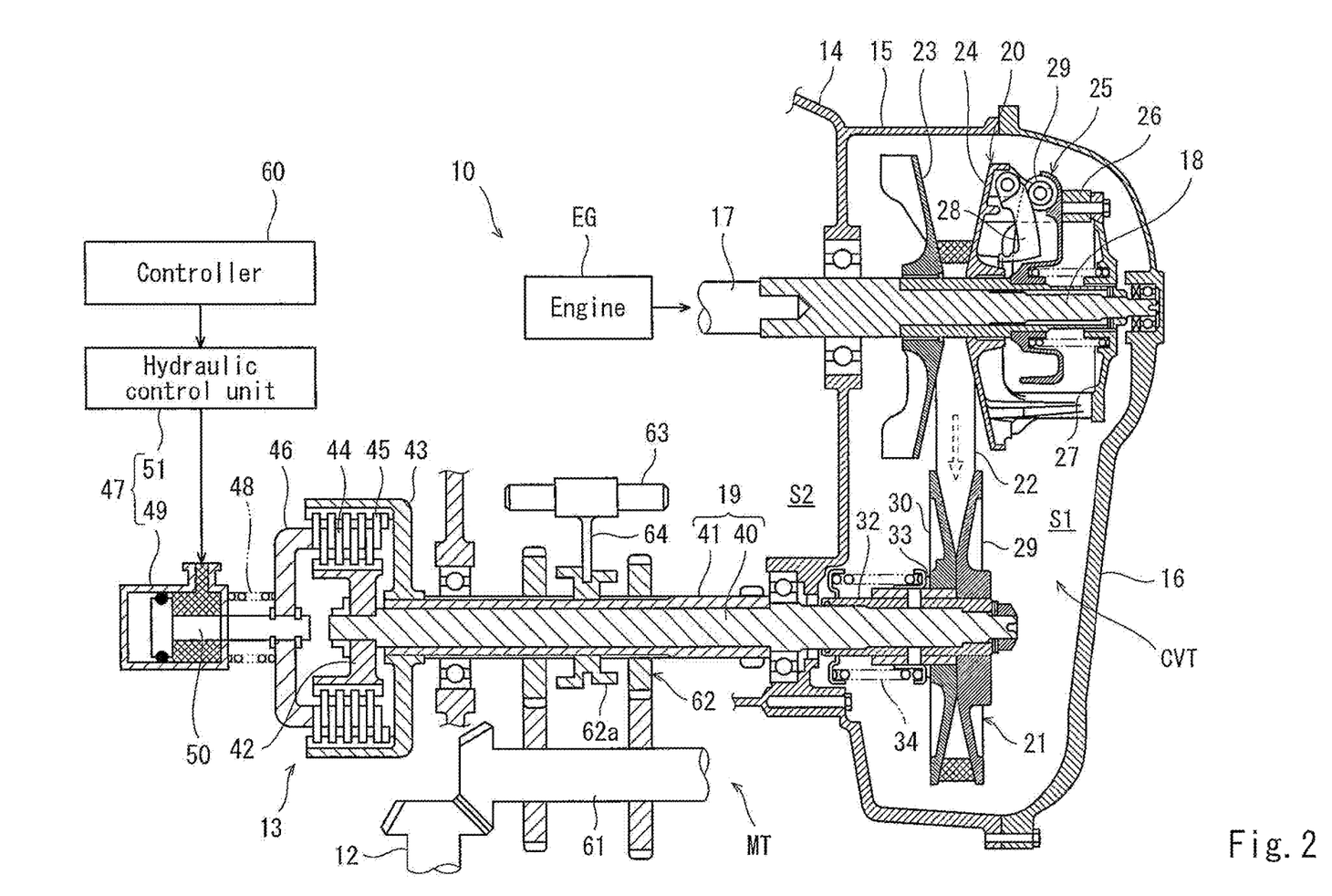
FIG. 2 is a horizontal sectional view of a driving power transmission structure of the utility vehicle of FIG. 1.

FIG. 2 is a horizontal sectional view of a driving power transmission structure 10 of the utility vehicle 1 of FIG. 1. As shown in FIG. 2, the driving power transmission structure 10 is configured to transmit the rotational driving power generated in the engine EG to the drive wheels (the front wheels 3 and/or the rear wheels 4). In the driving power transmission structure 10, the rotational driving power of a crankshaft 17 of the engine EG is transmitted to the CVT, a manual transmission (MT) and a drive shaft 12 in this order. In the driving power transmission structure 10, a clutch 13 is disposed between the MT and the drive shaft 12.

A CVT accommodating section 15 is provided at the outer side wall of a crankcase 14 of the engine EG. The CVT accommodating section 15 is adjacent to the engine EG. The CVT accommodating section 15 has a CVT accommodating space S1 which is covered by a CVT cover 16 and is elongated in a forward and rearward direction. Inside the crankcase 14, the crankshaft 17 extending in a vehicle width direction is placed and protrudes into the CVT accommodating space S1. In the CVT accommodating space S1, the CVT is placed.

The CVT is, for example, a CVT of a V-belt type and is accommodated in the CVT accommodating space S1. The CVT includes an input shaft 18 which is connected to the crankshaft 17 and receives as an input the rotational driving power transmitted from the engine EG, and an output shaft 19 which outputs the rotational driving power toward the drive shaft 12 (toward the drive wheels). The both end portions of the input shaft 18 are supported by the side wall of the crankcase 14 and the CVT cover 16. Although in the present embodiment, the crankshaft 17 and the input shaft 18 are directly coupled to each other, a centrifugal clutch may be interposed between the crankshaft 17 and the input shaft 18. The output shaft 19 includes a solid inner shaft portion 40 (first shaft portion) and a tubular outer shaft portion 41 (second shaft portion) externally fitted to the inner shaft portion 40. The both end portions of the inner shaft portion 40 extend in an axial direction and protrude outward farther than those of the outer shaft portion 41.

The input shaft 18 is provided with a drive pulley 20. The output shaft 19 is provided with a driven pulley 21. A V-shaped belt 22 is wrapped around the drive pulley 20 and the driven pulley 21. The drive pulley 20 includes a fixed sheave 23 fixed to the input shaft 18, a movable sheave 24 fitted to the input shaft 18 in such a manner that the movable sheave 24 is axially movable, and a sheave thrust generating mechanism 25 (e.g., flyweight type). The belt 22 is retained on conical retaining surfaces of the sheaves 23 and 24. When the movable sheave 24 moves on the input shaft 18 and a gap (space) formed between the movable sheave 24 and the fixed sheave 23 changes, a radial position where the belt 22 is retained (namely, effective diameter of the drive pulley 20) changes.

A receiver plate 27 is coupled to the back surface of the movable sheave 24 via a plurality of coupling arms 26 extending outward. The receiver plate 27 is configured to be movable in the axial direction of the input shaft 18 together with the movable sheave 24. The sheave thrust generating mechanism 25 is provided between the movable sheave 24 and the receiver plate 27. For example, in the sheave thrust generating mechanism 25, a plurality of flyweights 28 rotate away from the movable sheave 24 by a centrifugal force, and the movable sheave 24 is movable to approach the fixed sheave 23 by a reaction force pressing a pressure receiving roller 29. In other words, the sheave thrust generating mechanism 25 generates a thrust which reduces the gap formed between the movable sheave 24 and the fixed sheave 23 by a rotation centrifugal force of the drive pulley 20.

The driven pulley 21 includes a fixed sheave 29 fixed to the inner shaft portion 40 of the output shaft 19, and a movable sheave 30 fitted to the inner shaft portion 40 of the output shaft 19 in such a manner that the movable sheave 30 is axially movable. For example, a cam tube 32 with a plurality of spiral cam grooves is secured to the outer peripheral surface of the inner shaft portion 40 of the output shaft 19. The cam tube 32 and the fixed sheave 29 are rotatable together with the inner shaft portion 40 of the output shaft 19. A sleeve 33 is integrally coupled to the inner peripheral end of the movable sheave 30. The sleeve 33 is fitted to the outer peripheral surface of the cam tube 32 in such a manner that the sleeve 33 is axially movable. The sleeve 33 supports a roller (not shown) movable along the cam groove of the cam tube 32.

When the movable sheave 30 receives a rotational force by a tension of the belt 22, a thrust is generated in the movable sheave 30 to cause the movable sheave 30 to approach the fixed sheave 29 by a cam action of the cam tube 32 and the roller. The sleeve 33 is biased toward the fixed sheave 29 by a pressure adjustment spring 34. The movable sheave 30 is pressed against the fixed sheave 29.

With this configuration, in a state in which the input shaft 18 is rotating at a low speed, the effective diameter of the drive pulley 20 is small and the effective diameter of the driven pulley 21 is large (speed reduction ratio is high). When an engine speed of the engine EG increases, a thrust is generated in the sheave thrust generating mechanism 25 due to an increase in the centrifugal force of the drive pulley 20, the movable sheave 24 approaches the fixed sheave 23, and the effective diameter of the drive pulley 20 increases. In the driven pulley 21, the tension of the belt 22 increases, a radially inward force of the belt 22 increases, the movable sheave 30 moves away from the fixed sheave 29 against a spring force of the pressure adjustment spring 34 and a cam thrust of the cam tube 32, and the effective diameter of the driven pulley 21 reduces. In the above-described manner, the speed reduction ratio of the CVT reduces continuously with an increase in the engine speed.

The output shaft 19 protrudes into an inner space S2 of the crankcase 14. More specifically, the inner shaft portion 40 of the output shaft 19 extends over the inner space S2 of the crankcase 14 and the CVT accommodating space S1. The outer shaft portion 41 of the output shaft 19 is not placed in the CVT accommodating space S1 and placed in the inner space S2 of the crankcase 14. The inner shaft portion 40 is rotatable together with the driven pulley 21. The clutch 13 is disposed between the inner shaft portion 40 and the outer shaft portion 41. The outer shaft portion 41 is coaxial with the inner shaft portion 40. The outer shaft portion 41 is rotatable relative to the inner shaft portion 40. The outer shaft portion 41 outputs the rotational driving power toward the drive shaft 12 through the MT.

The clutch 13 is a friction clutch which is able to change a driving power transmission ratio continuously between a fully disengaged (disconnected) state and a fully engaged (connected) state. In the present embodiment, the clutch 13 is a wet type multiple disc clutch. An inner peripheral member 42 (input member) of the clutch 13 is spline-coupled to the end portion of the inner shaft portion 40 so that the inner peripheral member 42 is rotatable together with the inner shaft portion 40. An outer peripheral member 43 (output member) of the clutch 13 is spline-coupled to the end portion of the outer shaft portion 41 so that the outer peripheral member 43 is rotatable together with the outer shaft portion 41.

A friction plate 44 is provided on the outer peripheral portion of the inner peripheral member 42 and is axially movable. An opposing plate 45 is provided on the inner peripheral portion of the outer peripheral member 43 and is axially movable. A pressure plate 46 faces an assembly of the friction plate 44 and the opposing plate 45 and is able to press the assembly in the axial direction and move in the axial direction away from the assembly. The pressure plate 46 is coupled to a clutch actuator 47. The pressure plate 46 is biased by a biasing spring 48 so that the clutch 13 is engaged (connected). In a state in which the clutch actuator 47 does not apply a force to the pressure plate 46, the pressure plate 46 presses the assembly of the friction plate 44 and the opposing plate 45 by a spring force of the biasing spring 48. The clutch 13 is engaged in a state in which the clutch actuator 47 is not activated.

The clutch actuator 47 is a hydraulic actuator. The clutch actuator 47 includes a hydraulic cylinder 49, and a hydraulic control unit 51 which is able to feed a hydraulic (oil) pressure to the hydraulic cylinder 49. A piston rod 50 of the hydraulic cylinder 49 is coupled to the pressure plate 46. In this configuration, the hydraulic control unit 51 controlled by a controller 60 feeds the hydraulic (oil) pressure to the hydraulic cylinder 49. Thus, the piston rod 50 moves away from the clutch 13 and is disengaged.

As described above, the clutch 13 is disposed in a driving power transmission path at a location that is between the belt 22 of the CVT and the drive shaft 12. Therefore, in a case where an excessive load will be (is likely to be) transmitted from the drive wheel to the belt 22, the clutch 13 is disengaged (disconnected). This makes it possible to protect the belt 22 of the CVT from an excessive load.

The CVT is disposed on a first side (e.g., right side) in the vehicle width direction (rightward and leftward direction) when viewed from the engine EG. In contrast, the clutch 13 is disposed on a second side (e.g., left side) in the vehicle width direction when viewed from the engine EG. Specifically, the CVT is disposed outward of the crankcase 14 on the first side in the vehicle width direction, while the clutch 13 is disposed outward of the crankcase 14 on the second side in the vehicle width direction.

As described above, the clutch 13 is disposed on a side opposite to a side where the CVT is disposed. In this layout, the clutch 13 and the clutch actuator 47 do not interfere with the CVT, when the clutch 13 and the clutch actuator 47 are placed. For this reason, design flexibility of the layout of the clutch 13 and the clutch actuator 47 can be improved. The CVT accommodating space S1 is a dry space and a space in which the clutch 13 is placed is a wet space. This makes it possible to place the clutch 13 and the clutch actuator 47 without changing the conventional CVT. As a result, the design can be simplified.

The MT includes the outer shaft portion 41 as an input shaft, and an output shaft 61 disposed in parallel with the outer shaft portion 41. The MT is configured to transmit the driving power from the outer shaft portion 41 to the output shaft 61 via selected one of plural sets (e.g., two sets) of gear trains 62 with different gear ratios. The MT is, for example, a dog-gear type transmission, which changes the driving power via the selected one of the gear trains 62. In the MT, a shift fork 64 is slidably supported by a support shaft 63 placed in parallel with the outer shaft portion 41 and the output shaft 61. The first end portion of the shift fork 64 is connected to a dog gear 62a of the outer shaft portion 41. The second end portion of the shift fork 64 is fitted to a guide groove of a shift drum (not shown). The shift drum is mechanically rotatable in response to the driver's operation (manipulation) of a shift lever (not shown). According to the rotation of the shift drum, the shift fork 64 guided to the guide groove causes the dog gear 62a to slide along the outer shaft portion 41, one of the gear trains 62 with a reduction gear ratio which is desired by the driver is placed in a driving power transmission state, and a driving power transmission path with a desired transmission gear position is selected.

As described above, the MT is disposed between the output shaft 19 of the CVT and the drive shaft 12. By combining a speed change range of the MT and a speed change range of the CVT, a wide speed range can be obtained as a whole. Therefore, the size of the CVT can be reduced, in a case where a desired speed change range is obtained.

Figure 3:
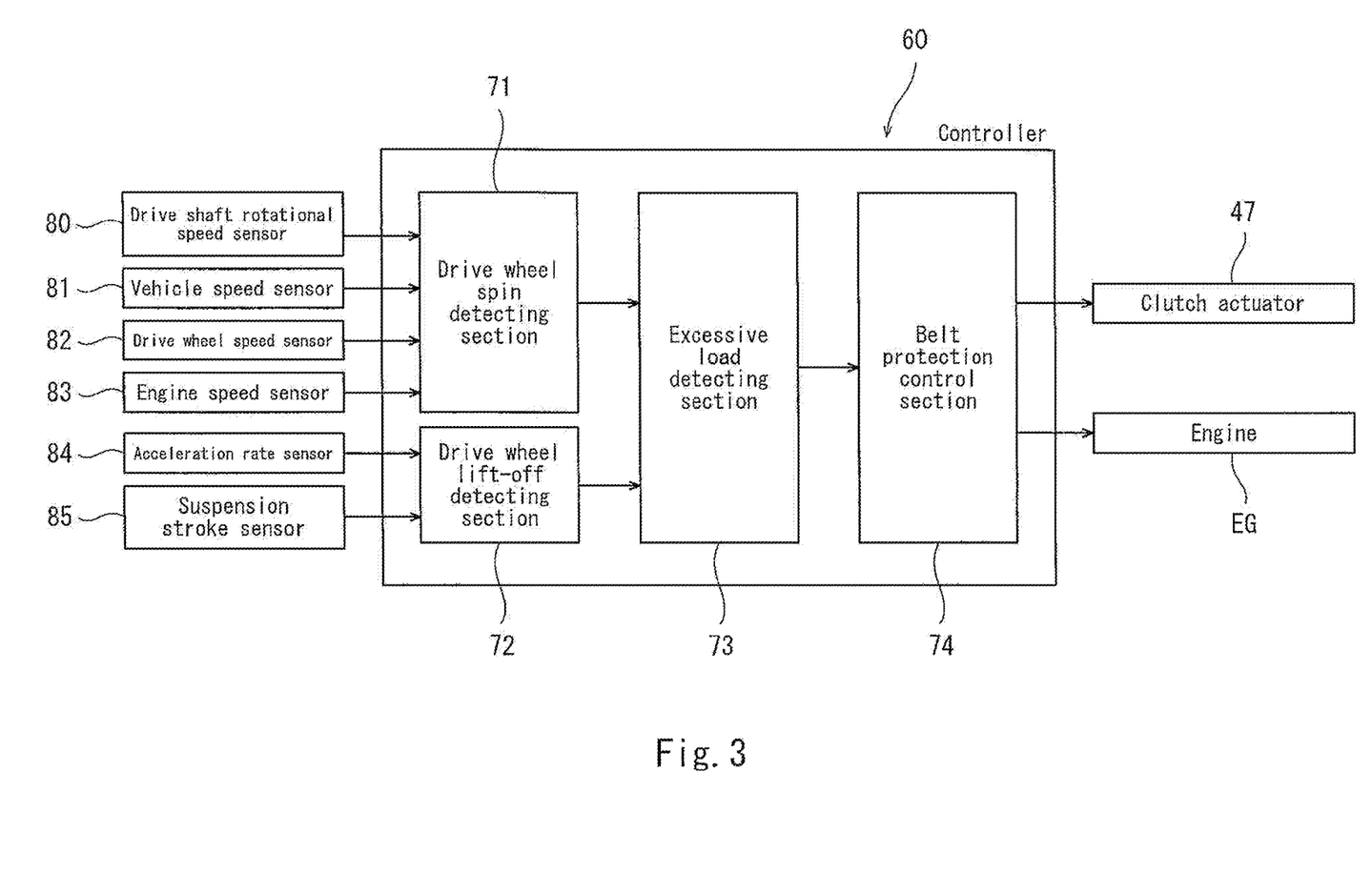
FIG. 3 is a block diagram of a controller of FIG. 2.

FIG. 3 is a block diagram of the controller 60 of FIG. 2. As shown in FIG. 3, the controller 60 includes as software, a drive wheel spin (slip) detecting section 71 (drive wheel spin detector), a drive wheel lift-off detecting section 72 (drive wheel lift-off detector), an excessive load detecting section 73 (excessive load detector), and a belt protection control section 74 (belt protection controller). The controller 60 includes as hardware, a processor, a volatile memory, a non-volatile memory, an I/O interface, or the like. These sections 71 to 74 are performed in such a manner that the processor performs calculation (computation) by use of the volatile memory based on programs stored in the non-volatile memory.

A drive shaft rotational speed sensor 80, a vehicle speed sensor 81, a drive wheel speed sensor 82, an engine speed sensor 83, an acceleration rate sensor 84, and a suspension stroke sensor 85 are connected to the input side of the controller 60. The drive shaft rotational speed sensor 80 is configured to detect the rotational speed of the drive shaft 12. The vehicle speed sensor 81 is configured to detect a traveling speed of the utility vehicle 1. The drive wheel speed sensor 82 is configured to detect the rotational speed of the drive wheel. The engine speed sensor 83 is configured to detect the rotational speed of the crankshaft 17 of the engine EG. The acceleration rate sensor 84 is mounted on the vehicle body frame 2 to detect a vertical acceleration rate of the utility vehicle 1. The suspension stroke sensor 85 is configured to detect a stroke of a suspension connecting the vehicle body frame 2 to the drive wheel.

The drive wheel spin (slip) detecting section 71 is configured to detect a slip ratio indicative of a degree of a spin of the drive wheel. For example, the slip ratio SL is calculated based on a speed difference between a drive wheel speed and the traveling speed. Specifically, in a case where the vehicle speed detected by the vehicle speed sensor 81 is Vv, and the drive wheel speed detected by the drive wheel speed sensor 82 is $V_D$, the slip ratio SL is calculated according to a formula $SL=(V_D-Vv)/Vv$. In a case where the slip ratio SL becomes higher than a predetermined value, it is determined that the drive wheel is spinning on the ground surface. Alternatively, the slip ratio SL may be calculated based on a rotational acceleration rate of a driving power system from the engine EG to the drive wheel. More specifically, in a case where a change rate of the drive wheel speed $V_D$ detected by the drive wheel speed sensor 82 is $\Delta V_D$, the slip ratio SL may be calculated according to a formula $SL=\Delta V_D$. Or, in a case where a change rate of an engine speed $V_E$ detected by the engine speed sensor 83 is $\Delta V_E$, the slip ratio SL may be calculated according to a formula $SL=\Delta V_E$.

The drive wheel lift-off detecting section 72 is configured to detect that the drive wheel is lifting-off the ground surface. For example, in a case where an upward acceleration rate detected by the acceleration rate sensor 84 has exceeded a predetermined threshold, the drive wheel lift-off detecting section 72 determines that the drive wheel is lifting-off the ground surface. Alternatively, in a case where a suspension stroke detected by the suspension stroke sensor 85 has exceeded the predetermined threshold, the drive wheel lift-off detecting section 72 determines that the drive wheel is lifting-off the ground surface.

The excessive load detecting section 73 is configured to detect that an excessive load will be (is likely to be) applied from the ground surface to the drive wheel. For example, in a case where the slip ratio SL detected by the drive wheel spin (slip) detecting section 71 has exceeded a predetermined start threshold Th1 and then has been reduced, the excessive load detecting section 73 determines that an excessive load will be applied to the drive wheel. In accordance with this, in a case where the drive wheel changes from a spin state to a gripping state, the excessive load detecting section 73 can suitably detect that an excessive load will be applied to the drive wheel.

Alternatively, in a case where the drive wheel lift-off detecting section 72 detects that the drive wheel is lifting-off the ground surface, the excessive load detecting section 73 may determine that an excessive load will be (is likely to be) applied to the drive wheel. This makes it possible to suitably detect that an excessive load will be applied to the drive wheel, based on an event that the utility vehicle 1 jumps, the drive wheel spins, the drive wheel is grounded, and the drive wheel grips the ground surface. The excessive load detecting section 73 may detect that an excessive load will be applied to the drive wheel, based on the information from only one of the drive wheel spin (slip) detecting section 71 and the drive wheel lift-off detecting section 72, or both of the drive wheel spin detecting section 71 and the drive wheel lift-off detecting section 72.

In a case where the excessive load detecting section 73 detects that an excessive load will be applied to the drive wheel, the belt protection control section 74 initiates the belt protection control. In the belt protection control, the clutch actuator 47 disengages the clutch 13. In a case where an excessive load will be (is likely to be) transmitted from the drive wheel to the belt 22 of the CVT, the clutch 13 is disengaged and the driving power is not permitted to be transmitted from the drive wheel to the belt 22. In this way, the belt 22 can be protected from an excessive load.

In the belt protection control, the driving power of the engine EG is suppressed (reduced). In the belt protection control, the driving power of the engine EG is compensated to be reduced compared to a state in which the belt protection control is not performed. In accordance with this control, in a case where an excessive load will be (is likely to be) transmitted from the drive wheel to the belt 22 of the CVT, the driving power transmitted from the engine EG to the belt 22 is suppressed (reduced). Therefore, the belt 22 of the CVT can be protected from an excessive load. In the belt protection control, only the control for disengaging the clutch 13 by the clutch actuator 47 may be performed, or only the control for suppressing the driving power of the engine EG may be performed.

Figure 4:
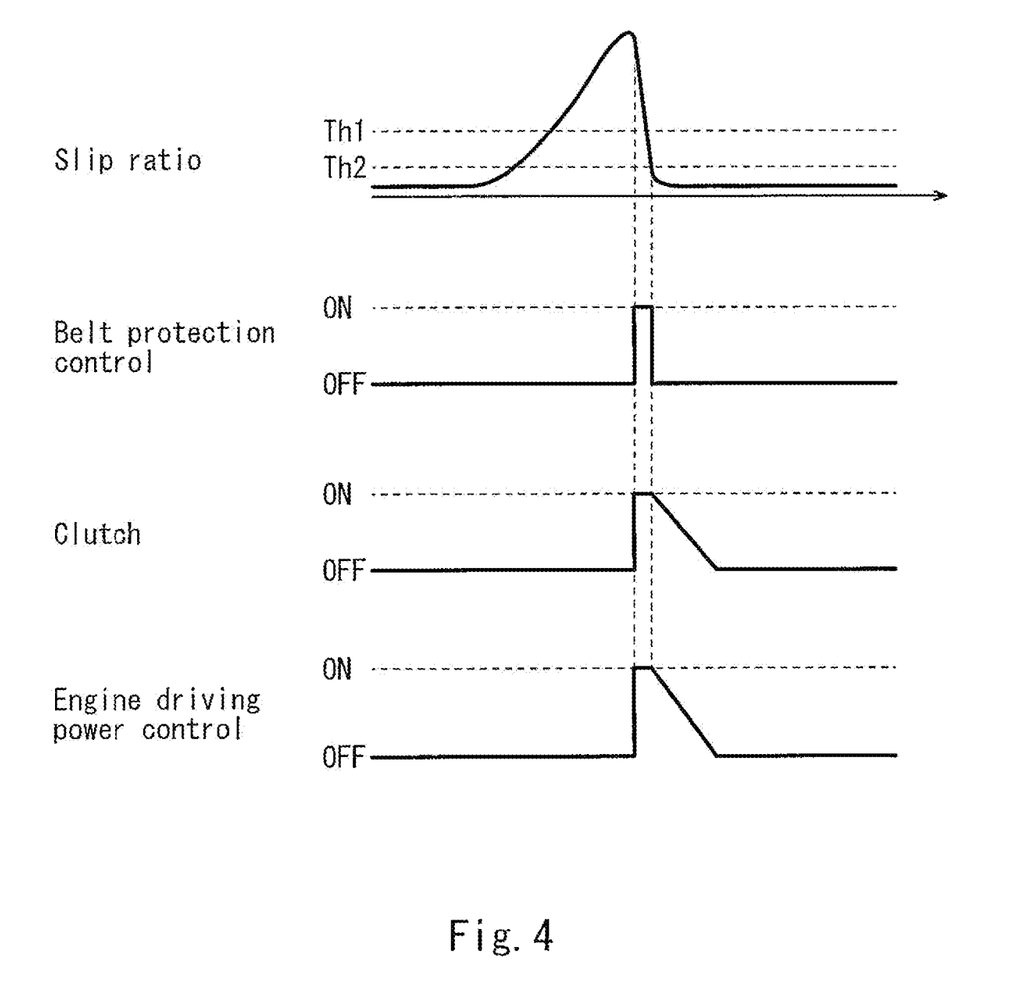
FIG. 4 is a timing chart of a belt protection control performed by the controller of FIG. 3.

FIG. 4 is a timing chart of the belt protection control performed by the controller 60 of FIG. 3. As shown in FIG. 4, in a case where the excessive load detecting section 73 detects that the drive wheel starts to shift from a spin state to a gripping state, the belt protection control section 74 initiates the belt protection control. For example, in a case where the excessive load detecting section 73 detects that the slip ratio SL has exceeded the start threshold Th1 and then has been reduced, the belt protection control section 74 initiates the belt protection control. Specifically, the belt protection control section 74 directs the clutch actuator 47 to disengage the clutch 13, and directs the engine EG to suppress (reduce) the driving power of the engine EG. In the belt protection control, only one of disengagement of the clutch 13 and suppressing the driving power of the engine EG may be performed (either disengagement of the clutch 13 or suppressing the driving power of the engine EG may be performed).

In a case where the excessive load detecting section 73 detects that shifting of the drive wheel from the spin state to the gripping state is completed, the belt protection control section 74 terminates the belt protection control. For example, in a case where the excessive load detecting section 73 detects that the slip ratio SL has exceeded the start threshold Th1 and then has fallen below a termination threshold Th2, the belt protection control section 74 terminates the belt protection control. Although the termination threshold Th2 is smaller than the start threshold Th1, the termination threshold Th2 may be equal to the start threshold Th1. Specifically, the belt protection control section 74 may direct the clutch actuator 47 to gradually engage the clutch 13 so that the clutch 13 is shifted from a fully disengaged state to a completely engaged state through a semi-clutch state. In addition, the belt protection control section 74 directs the engine EG to gradually reduce the amount of the engine power to be suppressed (reduced), to zero.

In accordance with the above-described configuration, the clutch 13 is disengaged in a case where an excessive load will be (is likely to be) transmitted from the drive wheel to the belt 22 of the CVT. Therefore, the belt 22 of the CVT can be protected from an excessive load. As a result, a frequency of change of the belt 22 can be reduced. Alternatively, the belt protection control section 74 may terminate the belt protection control when a predetermined lag time has passed, after the excessive load detecting section 73 detected that shifting of the drive wheel from the spin state to the gripping state is completed. Further, the belt protection control section 74 may make a difference between a time point when the belt protection control performed by disengaging the clutch 13 is terminated and a time point when the belt protection control performed by suppressing (reducing) the engine driving power is terminated.

Embodiment 2

Figure 5:
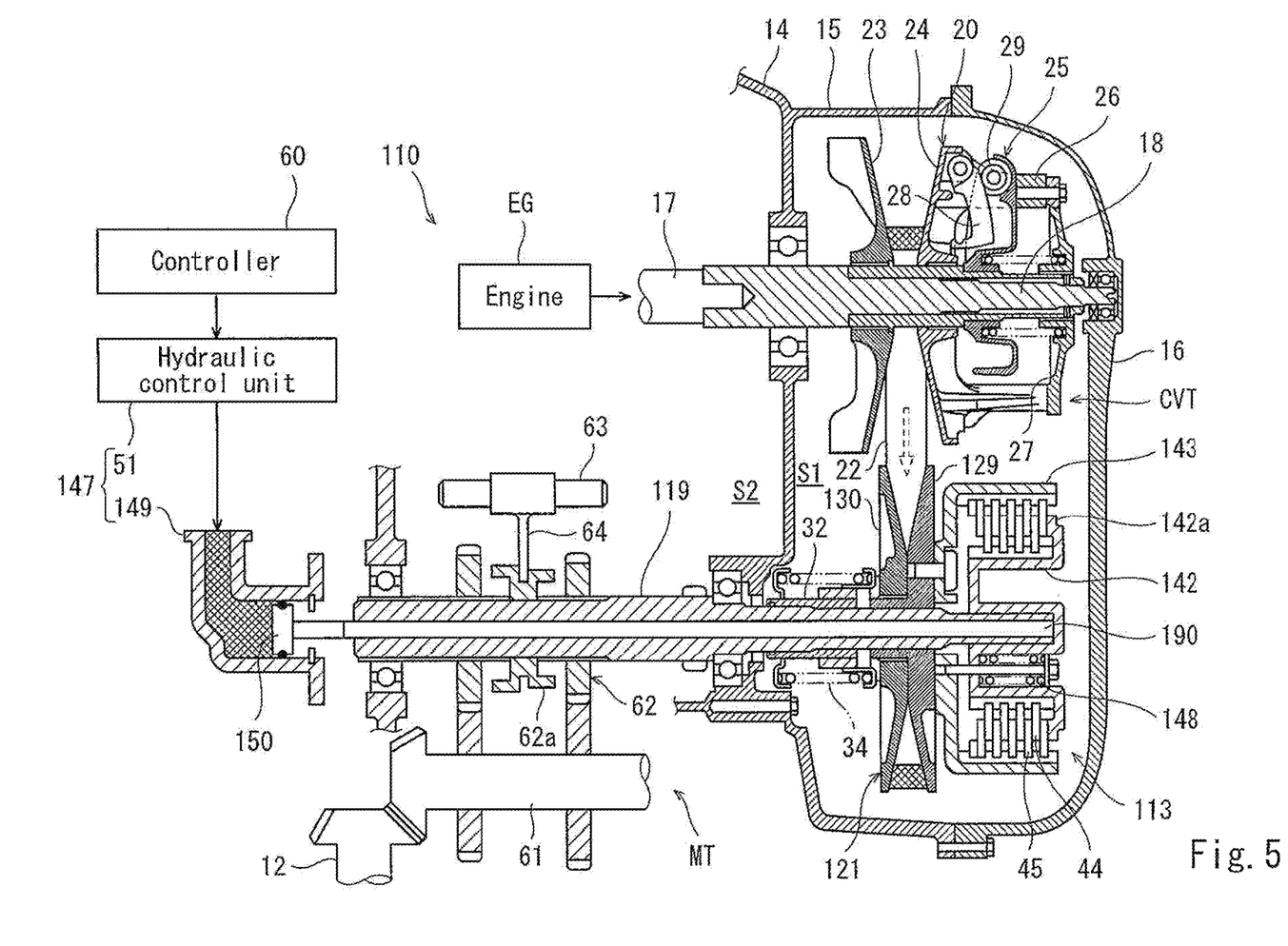
FIG. 5 is a horizontal sectional view of a driving power transmission structure of a utility vehicle according to Embodiment 2.

FIG. 5 is a horizontal sectional view of a driving power transmission structure 110 of a utility vehicle according to Embodiment 2. The constituents which are the same as those of Embodiment 1 are designated by the same reference symbols and will not be described. As shown in FIG. 5, in Embodiment 2, in the driving power transmission structure 110 in which the rotational driving power of the engine EG is transmitted to the drive wheels (the front wheels 3 and/or the rear wheels 4), the rotational driving power of the crankshaft 17 of the engine EG is transmitted to the CVT, the MT and the drive shaft 12 in this order, and a clutch 113 is disposed between a driven pulley 121 of the CVT and an output shaft 119 of the CVT.

A fixed sheave 129 and a movable sheave 130 of the driven pulley 121 are fitted to the output shaft 119 in such a manner that the fixed sheave 129 and the movable sheave 130 are rotatable relative to the output shaft 119. The clutch 113 is a friction clutch (e.g., multi-disc clutch) as in Embodiment 1. An outer peripheral member 143 (input member) of the clutch 113 is secured to the fixed sheave 129 in such a manner that the outer peripheral member 143 is rotatable together with the driven pulley 121. An inner peripheral member 142 (output member) of the clutch 113 is spline-coupled to the end portion of the output shaft 119 in such a manner that the inner peripheral member 142 is rotatable together with the output shaft 119.

The friction plate 44 is provided on the outer peripheral portion of the inner peripheral member 142 and is axially movable. The opposing plate 45 is provided on the inner peripheral portion of the outer peripheral member 143 and is axially movable. A pressure member 142a is provided at the outer peripheral portion of the inner peripheral member 142 to face an assembly of the friction plate 44 and the opposing plate 45 so that the pressure member 142a is able to press the assembly of the friction plate 44 and the opposing plate 45 in the axial direction and move away from the assembly in the axial direction. The inner peripheral member 142 is biased by a biasing spring 148 so that the clutch 113 is engaged. In a state in which the pressure member 142a of the inner peripheral member 142 is kept to press the assembly of the friction plate 44 and the opposing plate 45 by a spring force applied by the biasing spring 148 in a state in which a clutch actuator 147 is not applying a force to the pressure member 142a.

The output shaft 119 has a tubular shape. A clutch rod 190 is slidably inserted into a hollow space of the output shaft 119. The tip end portion of the clutch rod 190 faces the center portion of the inner peripheral member 142 in such a manner that the tip end portion is able to press the center portion. More specifically, the clutch rod 190 presses the inner peripheral member 142 in the axial direction. This causes the pressure member 142a to move away from the assembly of the friction plate 44 and the opposing plate 45. As a result, the clutch 113 is disengaged.

The clutch actuator 147 includes a hydraulic cylinder 149, and the hydraulic control unit 51 which is capable of feeding a hydraulic pressure (oil pressure) to the hydraulic cylinder 149. A piston 150 of the hydraulic cylinder 149 is secured to the clutch rod 190. In this structure, the hydraulic control unit 51 controlled by the controller 60 feeds the hydraulic pressure to the hydraulic cylinder 149 so that the piston 150 advances the clutch rod 190. In this way, the clutch 113 is disengaged.

As described above, the clutch 113 is disposed in the driving power transmission path at a location that is between the belt 22 of the CVT and the drive shaft 12. In a case where an excessive load is likely to be transmitted from the drive wheel to the belt 22 of the CVT, the clutch 113 is disengaged. In this way, the belt 22 of the CVT can be protected from an excessive load. Since the clutch 113 is disposed in the CVT accommodating space S1, the members can be arranged densely. The other constituents of Embodiment 2 are the same as those of Embodiment 1 and will not be described in repetition.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims. For example, the clutch 13, 113 may be disposed at a location different from the above-described location so long as the clutch 13, 113 is disposed in the driving power transmission path at a location that is between the belt 22 and the drive wheel.

The invention claimed is:

1. A utility vehicle comprising:
  a traveling driving power source which generates rotational driving power for driving a drive wheel;
  a continuously variable transmission including an input shaft to which the rotational driving power transmitted from the traveling driving power source is input, an output shaft which outputs the rotational driving power toward the drive wheel, a drive pulley provided at the input shaft, a driven pulley provided at the output shaft, and a belt wrapped around the drive pulley and the driven pulley;
  an excessive load detector which detects that an excessive load will be applied to the drive wheel by detecting a change in a rotational speed of a driving power transmission system from the traveling driving power source to the drive wheel; and
  a belt protection controller which executes belt protection control of suppressing a force transmitted to the belt, in a case where the excessive load detector detects that the excessive load will be applied to the drive wheel,
  wherein the excessive load detector detects that the excessive load will be applied to the drive wheel, based on the detected change in the rotational speed of the driving power transmission system from the traveling driving power source to the drive wheel exceeding a predetermined change threshold.

2. The utility vehicle according to claim 1,
  wherein the belt protection controller suppresses the rotational driving power of the traveling driving power source, in a case where the excessive load detector detects that the excessive load will be applied to the drive wheel.

3. The utility vehicle according to claim 2,
  wherein when a termination condition of the belt protection control is satisfied, the belt protection controller terminates the belt protection control by reducing a suppressed amount of the rotational driving power of the traveling driving power source to zero.

4. The utility vehicle according to claim 1, further comprising:
- a clutch which is disposed in a driving power transmission path at a location that is between the belt and the drive wheel and is capable of disconnecting the driving power transmission path; and
- a clutch actuator which operates the clutch,
- wherein the belt protection controller drives the clutch actuator to disengage the clutch, in a case where the excessive load detector detects that the excessive load will be applied to the drive wheel.

5. The utility vehicle according to claim 4,
- wherein when a termination condition of the belt protection control is satisfied, the belt protection controller terminates the belt protection control by engaging the clutch so that the clutch is shifted from a fully disengaged state to a completely engaged state through a semi-clutch state.

6. A utility vehicle comprising:
- a traveling driving power source which generates rotational driving power for driving a drive wheel;
- a continuously variable transmission including an input shaft to which the rotational driving power transmitted from the traveling driving power source is input, an output shaft which outputs the rotational driving power toward the drive wheel, a drive pulley provided at the input shaft, a driven pulley provided at the output shaft, and a belt wrapped around the drive pulley and the driven pulley;
- an excessive load detector which detects that an excessive load will be applied to the drive wheel; and
- a belt protection controller which suppresses a force transmitted to the belt, in a case where the excessive load detector detects that the excessive load will be applied to the drive wheel,
- wherein the excessive load detector determines that the excessive load will be applied to the drive wheel, in a case where the excessive load detector detects that a slip ratio of the drive wheel has changed from a value smaller than a predetermined threshold into a value larger than the predetermined threshold, and then has been reduced.

7. The utility vehicle according to claim 6,
- wherein when a termination condition of the belt protection control is satisfied, the belt protection controller reduces a suppression rate in the control of suppressing the force transmitted to the belt, to zero finally.

8. The utility vehicle according to claim 6,
- wherein the belt protection controller suppresses the rotational driving power of the traveling driving power source, in a case where the excessive load detector detects that the excessive load will be applied to the drive wheel.

9. The utility vehicle according to claim 8,
- wherein when a termination condition of the belt protection control is satisfied, the belt protection controller terminates the belt protection control by reducing a suppressed amount of the rotational driving power of the traveling driving power source to zero.

10. The utility vehicle according to claim 6, further comprising:
- a clutch which is disposed in a driving power transmission path at a location that is between the belt and the drive wheel and is capable of disconnecting the driving power transmission path; and
- a clutch actuator which operates the clutch,
- wherein the belt protection controller drives the clutch actuator to disengage the clutch, in a case where the excessive load detector detects that the excessive load will be applied to the drive wheel.

11. The utility vehicle according to claim 10,
- wherein when a termination condition of the belt protection control is satisfied, the belt protection controller terminates the belt protection control by engaging the clutch so that the clutch is shifted from a fully disengaged state to a completely engaged state through a semi-clutch state.

12. The utility vehicle according to claim 6,
- wherein when it is detected that a slip ratio of the drive wheel has exceeded a start threshold and then has fallen below a termination threshold, the belt protection controller terminates the belt protection control, and
- wherein the termination threshold is a value smaller than or equal to the start threshold.

13. A utility vehicle comprising:
- a traveling driving power source which generates rotational driving power for driving a drive wheel;
- a continuously variable transmission including an input shaft to which the rotational driving power transmitted from the traveling driving power source is input, an output shaft which outputs the rotational driving power toward the drive wheel, a drive pulley provided at the input shaft, a driven pulley provided at the output shaft, and a belt wrapped around the drive pulley and the driven pulley;
- an excessive load detector which detects that an excessive load will be applied to the drive wheel;
- a belt protection controller which suppresses a force transmitted to the belt, in a case where the excessive load detector detects that the excessive load will be applied to the drive wheel; and
- a drive wheel lift-off detector which detects that the drive wheel is lifting-off a ground surface,
- wherein the excessive load detector determines that the excessive load will be applied to the drive wheel, in a case where the drive wheel lift-off detector detects that the drive wheel is lifting-off the ground surface.

14. The utility vehicle according to claim 13,
- wherein the drive wheel lift-off detector is a sensor capable of detecting a vertical acceleration rate of a vehicle body.

15. The utility vehicle according to claim 13,
- wherein the drive wheel lift-off detector is a sensor capable of detecting a stroke of a suspension between the drive wheel and a vehicle body.

16. The utility vehicle according to claim 13,
- wherein when a termination condition of the belt protection control is satisfied, the belt protection controller reduces a suppression rate in the control of suppressing the force transmitted to the belt, to zero finally.

17. The utility vehicle according to claim 13,
- wherein the belt protection controller suppresses the rotational driving power of the traveling driving power source, in a case where the excessive load detector detects that the excessive load will be applied to the drive wheel.

18. The utility vehicle according to claim 17,
- wherein when a termination condition of the belt protection control is satisfied, the belt protection controller terminates the belt protection control by reducing a suppressed amount of the rotational driving power of the traveling driving power source to zero.

19. The utility vehicle according to claim 13, further comprising:
- a clutch which is disposed in a driving power transmission path at a location that is between the belt and the drive wheel and is capable of disconnecting the driving power transmission path; and
- a clutch actuator which operates the clutch,
- wherein the belt protection controller drives the clutch actuator to disengage the clutch, in a case where the excessive load detector detects that the excessive load will be applied to the drive wheel.

20. The utility vehicle according to claim 19,
- wherein when a termination condition of the belt protection control is satisfied, the belt protection controller terminates the belt protection control by engaging the clutch so that the clutch is shifted from a fully disengaged state to a completely engaged state through a semi-clutch state.

\* \* \* \* \*